United States Patent [19]

Flachs

[11] Patent Number: 4,860,404
[45] Date of Patent: Aug. 29, 1989

[54] PORTABLE DEER POLE

[76] Inventor: Bernard E. Flachs, 2305 Jones, Pierson, Mich. 49333

[21] Appl. No.: 171,110

[22] Filed: Mar. 21, 1988

[51] Int. Cl.⁴ ............................................. A22B 1/00
[52] U.S. Cl. ...................................... 17/44; 17/44.2; 254/334
[58] Field of Search .................. 17/44, 44.2, 21; 254/334 X, 324, 325

[56] References Cited

U.S. PATENT DOCUMENTS

| | | |
|---|---|---|
| 29,606 | 8/1860 | Lyons . |
| 94,076 | 8/1869 | Chambers et al. . |
| 95,691 | 10/1869 | Howland . |
| 159,024 | 1/1875 | Duroy . |
| 192,723 | 7/1877 | Wheeler . |
| 322,181 | 7/1885 | Hursh ............................. 17/44 X |
| 539,341 | 5/1895 | Brown ........................... 254/334 X |
| 916,191 | 3/1909 | Pederson . |
| 955,140 | 4/1910 | Cronk . |
| 1,214,104 | 1/1917 | Wingire ............................... 254/334 |
| 3,765,630 | 10/1973 | Woolley .............................. 248/165 |
| 3,779,497 | 12/1973 | Webber .............................. 248/165 |
| 3,894,313 | 7/1975 | Miller ............................... 17/44.2 |
| 4,338,703 | 7/1982 | Tanner .............................. 17/44 |
| 4,438,905 | 3/1984 | Nishimura .......................... 254/389 |
| 4,469,307 | 9/1984 | Bell .................................. 254/199 |

FOREIGN PATENT DOCUMENTS 444830  8/1912  France .................................... 17/44
194356  2/1965  Sweden ................................... 17/44

OTHER PUBLICATIONS

Excerpt from *The Sportsman's Guide Inc.*, Fall of 1987 publication.

*Primary Examiner*—Willis Little
*Attorney, Agent, or Firm*—Price, Heneveld, Cooper, DeWitt & Litton

[57] ABSTRACT

A strong yet portable deer pole including a platform, removable support legs telescopingly received in sockets on the platform for supporting the platform above the ground and a plurality of hangers which extend from the platform to support multiple game animals such as deer. A winch is rigidly interconnected with the platform and a cable from the winch extending over one of the hangers raises the animals to the support platform where the animals may be tied to the hangers. Optional tensioning cables between feet on the distal ends of legs keep the distal ends tensioned together for use on uneven terrain.

12 Claims, 2 Drawing Sheets

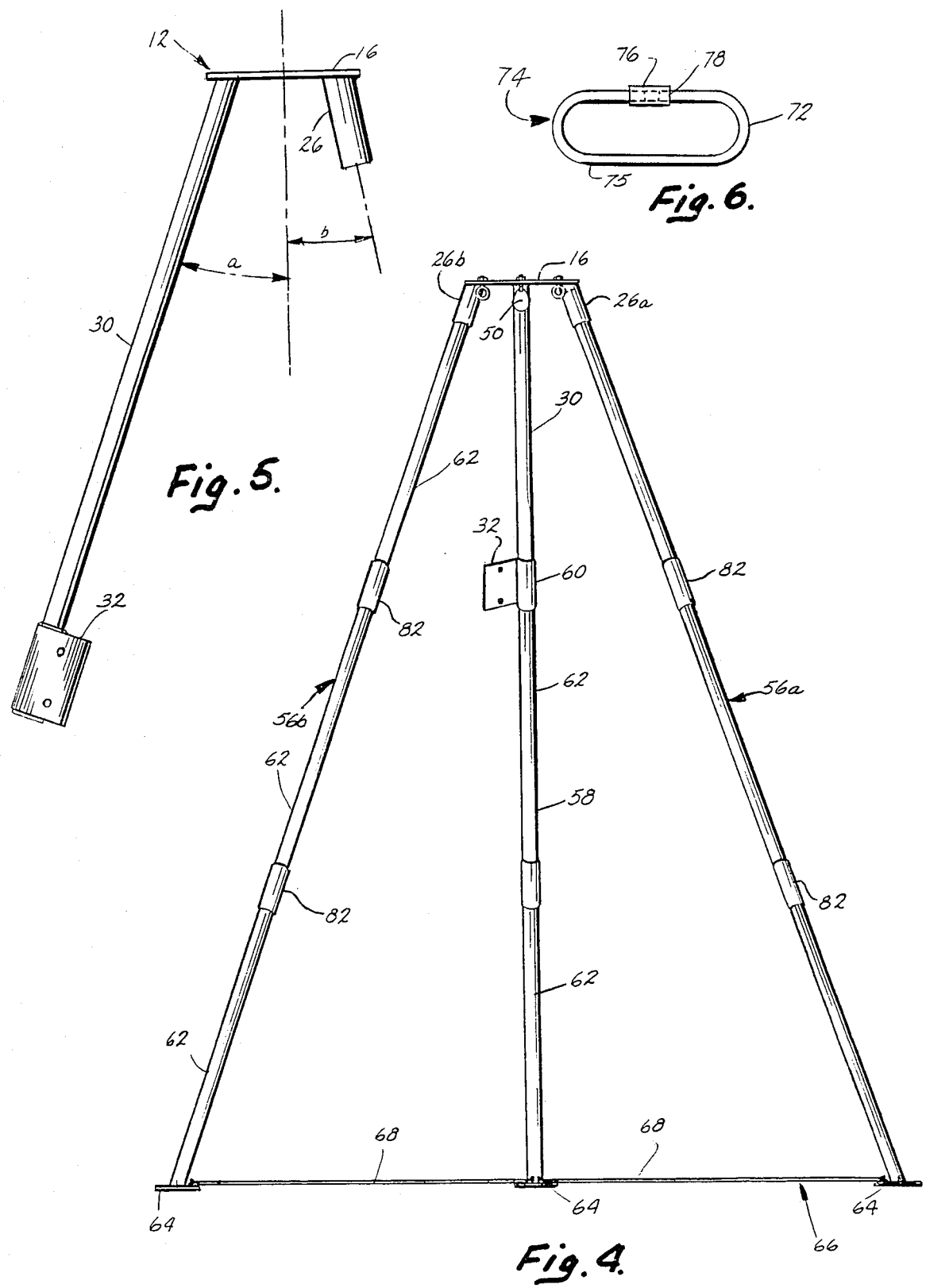

PORTABLE DEER POLE

BACKGROUND OF THE INVENTION

This invention relates to devices for elevating game such as deer and the like off the ground and in particular to a deer pole of the type that may be readily disassembled to a compact package.

Hunted game animals such as deer are conventionally hung from a tree to be disemboweled and to air the meat. Some regions, however, have a scarcity of suitable trees for use in supporting a game animal off the ground. Accordingly, portable deer poles have been proposed, but the prior art deer poles have substantial drawbacks. In order to provide a compact, portable configuration, the prior art deer poles have suffered from insufficient lateral strength and therefore are inadequate to drag an animal laterally as well as elevating the animal as would be required to hang an animal directly from the bed of a pickup truck. In addition, a serious drawback of the proposed portable deer poles are that they are incapable of supporting more than one game animal and therefore have very limited utility especially if used by a hunting party.

SUMMARY OF THE INVENTION

A portable deer pole according to the invention has a platform, support means for supporting the platform above the ground, a plurality of hangers extending from the platform and a cable extending from one of the hangers to elevate game towards the platform. The support means are removable from the platform to provide portability. In use, the cable is attached to a head portion of a game animal and raises the animal towards the platform. When the animal head is adjacent the platform, a rope or the like is extended from an adjacent hanger around the head of the animal which may then be removed from the cable. The cable is then free to elevate a second animal which may be tied-off to an adjacent hanger in a like manner. It has been found that two animals may be supported from a single hanger with their backs together and feet outward. In this manner, a portable deer pole according to the invention and having three hangers, may support five animals - two on each adjacent hanger and one on the cable.

The present invention provides great flexibility by allowing multiple game animals to be supported. The deer pole can be disassembled to a compact, lightweight package for portability. Yet, a deer pole according to the invention has surprising strength and is capable of supporting large loads in both the vertical and horizontal directions. Accordingly, the present invention may be used to unload animals from a truck as well as merely elevating the animals. Further, the present invention may be used on uneven terrain.

These and other related objects, advantages and features of this invention will become apparent upon review of the following specification in conjunction with the drawings.

BRIEF DESCRIPTION OF THE DRAWINGS

FIG. 4 is a full elevation of the frame;

FIG. 5 is an elevation of the frame portion of the platform assembly; and

FIG. 6 is an enlarged view of a tensioning means attachment ring.

DESCRIPTION OF THE PREFERRED EMBODIMENT

Referring now specifically to the drawings, and the illustrative embodiments depicted therein, a portable deer pole 10 includes an elevated platform assembly 12 supported vertically off the ground and horizontally constrained by support means generally shown at 14.

Figure 1:
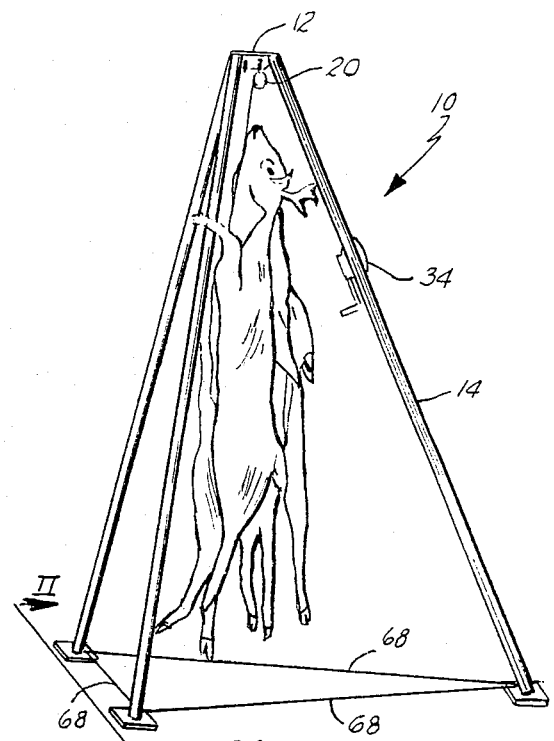
FIG. 1 is a perspective showing a fully assembled deer pole according to the invention in use supporting multiple game animals.
Figure 3:
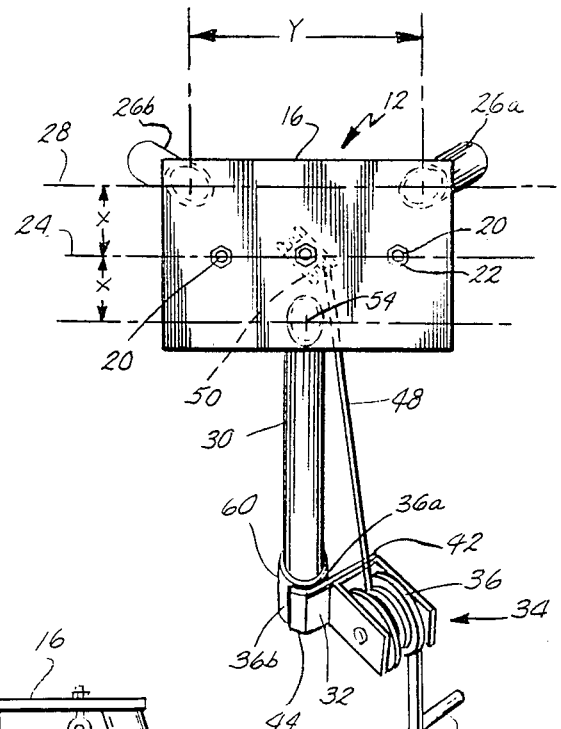
FIG. 3 is a plan view of the apparatus in FIG. 1.
Figure 2:
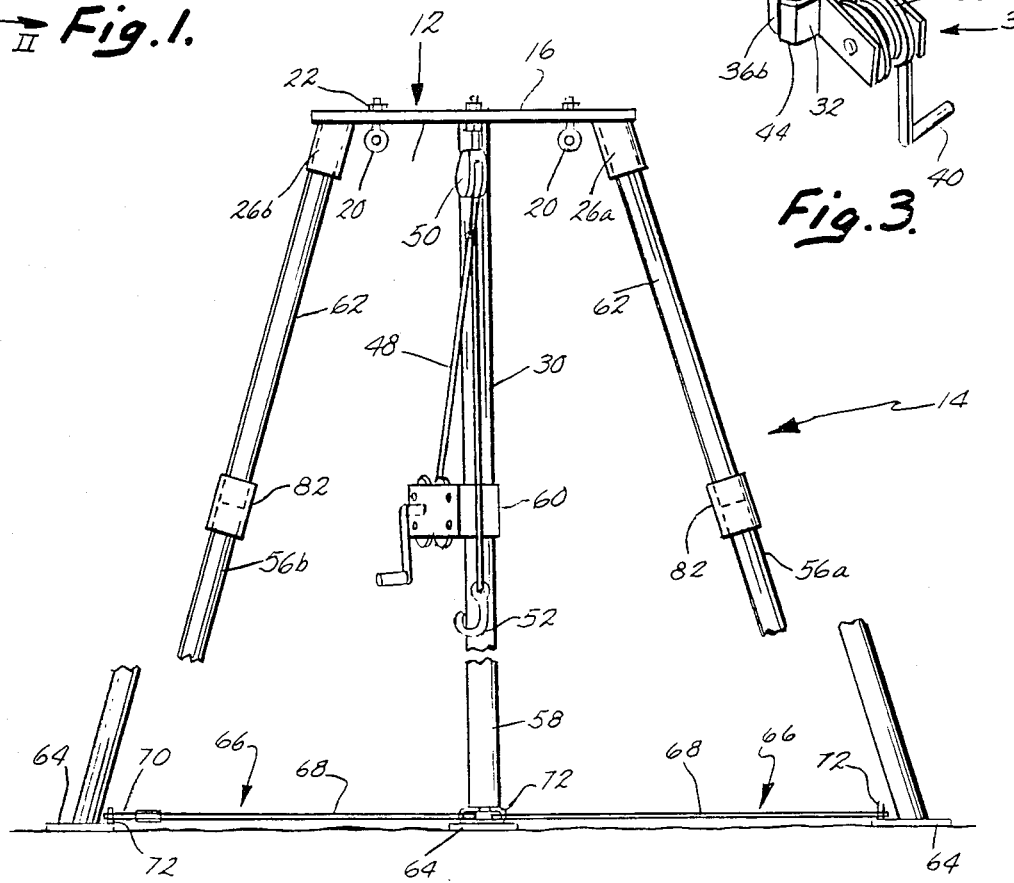
FIG. 2 is a truncated elevation taken along the lines II—II in FIG. 1.

Platform assembly 12 includes a generally planar platform 16 having a lower surface 18 from which a plurality of hangers 20 extend. In a preferred embodiment, hangers 20 are eye-bolts having threaded stems extending through openings in platform 16 and secured by nuts 22. In the preferred embodiment, three such hangers are provided, that are spaced apart and oriented colinearly along an axis shown at 24 (FIG. 3).

Platform assembly 12 further includes a pair of sockets 26 that are welded to surface 18. Sockets 26 are oriented on a plane which is vertically inclined and which intersects platform 16 at a second axis shown at 28. Platform assembly 12 further includes an elongated member 30 extending from lower surface 18 and nonrotatably attached to platform 16 at a point 54 as by welding or the like. A bracket 32 is attached to a distal end o elongated member 30 and is provided in order to support a coiling device generally shown at 34. Bracket 32 has a first planar portion 42 and a shorter second planar portion 44 extending perpendicularly from one end of first planar portion 42. Bracket 32 is affixed to member 30 by welding and is securely attached by providing weld lines 36A and 36B between planar portions 42, 44, respectively, and the member 30. Coiling device 34 is illustrated as a manually operable winch and includes a reel 36 and means such as crank 40 for rotating the reel. A cable 48 is wound on reel 36, extends over a pulley 50 suspended from one hanger 20 and terminates in a hook 52.

Reel 36 may be positioned conveniently to provide an unobstructed path to pulley 50 and to provide comfortable user access to crank 40. Any rotation force placed on member 30 by cable 48 is well supported because elongated member 30 is nonrotatably attached to platform 16 and bracket 32 is attached to member 30 with great strength. Point 54 at which elongated member 30 attaches to platform 16 is spaced from the hanger axis 24 a distance X, which is the same distance X that hanger axis 24 is spaced from socket axis 28. In this manner, suitable clearance is provided between the hangers and adjacent structure to accommodate multiple game animals. Additionally, the distance Y between sockets 26a and 26b is selected to be more than twice X in order to provide ample spacing between the hangers and to add stability to the platform.

As illustrated in FIG. 4, support means 14 includes first and second legs 56a, 56b telescopingly extending into sockets 26a and 26b, respectively. Support means 14 further includes a third leg 58 telescopingly received in a socket 60 provided on the distal end of elongated member 30 and to which bracket 32 is attached. Each leg 56a, 56b, 58 is comprised of a plurality of leg sections 62 joined together by slip-fit couplings 82 which are well-known in the art. The lowermost section 62 of each leg is terminated in a foot 64 which is a pad configured to provide firm support against the ground. Optional tensioning means 66 extend between the lower ends of legs 56a, 56b, 58 to tension the ends together. The tensioning means are not required in all embodiments of the invention, but provide additional strength especially when deer pole 10 is used on uneven terrain. In a preferred embodiment, tensioning means 66 includes flexible cables 68 extending between adjacent legs. Cables 68 are provided at each end with a looped portion 70. An attachment means 72 is provided on each foot 64 for attaching the cable loop portions to the legs (FIG. 6). Each attachment means 72 includes a ring 74 having an opening 76 which is selectively closed by a threaded sleeve 78 telescopingly engaged with a threaded portion of ring 74 adjacent opening 76. A base portion 75 of each ring 74 is welded to the respective foot and adjacent looped portions 70 are attached to their respective ring by rotating sleeves 78 to expose openings 76 and then again rotating sleeves 78 to close the openings.

Referring to FIGS. 3 and 5, the deer pole frame does not form a symmetrical tripod. Rather elongated member 30 extends from a vertical plane at an angle A and sockets 26a, 26b extend from the same vertical plane at an angle B. As previously explained, the spacing between sockets 26a and 26b is greater than the distance between the axes where the plane of sockets 26, and the point where elongated member 30 intersect platform 16. The purpose of this arrangement is to configure platform assembly 16 with ample spacing between the hangers and ample clearance between the hangers and adjacent structure. To accommodate this configuration, but to allow the flexible cables 68 to be of equal length, it is necessary for angles A and B to be adjusted in order to have feet 64 spaced equidistant from each other. The selection of angles A and B are a matter of calculation within the skill of the artisan.

To assemble deer pole 10, legs 56a and 56b are assembled from leg sections 62 and are inserted telescopingly in sockets 26a, 26b and retained therein by friction. With legs 56a and 56b resting on the ground, leg 58 is assembled from leg sections 62 and inserted telescopingly in socket 60. Cables 66 are then attached between attachment means 72 in the manner previously described. With the pole on the ground, tensioning means 66 will be slack and easy to assemble. Deer pole 10 is then stood upright by pivoting about the feet on legs 56a and 56b.

To use a fully assembled deer pole according to the invention, hook 52 is lowered by operation of crank 40 and is used to attach cable 48 to the head of a deer which may be positioned on the ground or on the bed of a pickup truck or other platform. The crank 40 is operated to move the deer laterally and upwardly until it is fully suspended off the ground. If more than one deer is to be suspended, the first deer is tied-off to an adjacent hanger 20 by a piece of rope or the like. Hook 52 may now be lowered to elevate the next deer. Two such deer may be suspended on each outside hanger 20 and a fifth deer suspended on cable 48.

In the illustrated embodiment, leg sections 62 are made from 2" round tubing of 1/32" high carbon steel. Socket 60 and joints 82 are formed by enlarging an end portion of the respective tubular member. Cables 68 are flexible steel cables. Coiling device 34 in the preferred embodiment is a commercially available winch manufactured by Fulton Milwaukee under Model No. T 6312.

Changes and modifications in the specifically described embodiments can be carried out without departing from the principles of the invention. For example, a motorized winch could be used for a coiling device 34. Additionally, hangers 20 could be in any form that would allow game to be suspended therefrom. The protection afforded the invention is intended to be limited only by the scope of the appended claims, as interpreted according to the principles of patent law, including the Doctrine of Equivalents.

The embodiments of the invention in which an exclusive property or privilege is claimed are defined as follows:

1. A portable game support apparatus comprising:
    a general planar platform including three sockets and a plurality of hangers, said sockets and hangers extending from a surface of said platform;
    three leg members having first ends configured for telescoping engagement with said sockets;
    an elongated member between one of said sockets and said platform, said elongated member having one end nonrotatably attached to said platform;
    a hoisting device attached to said elongated member in a manner to resist rotation about said elongated member;
    a cable extending from said hoisting device over one of said hangers and configured to elevate game toward said platform in response to operation of said hoisting device; and
    said hangers being fixedly positioned on said platform in close spatial association such that game elevated to a position proximate said platform by said cable extending from one of said hangers may be tied to another one of said hangers, whereby multiple game may be supported from said platform without movement of said hangers, by elevating each game by said cable and connecting the elevated game to other ones of said hangers.

2. The apparatus in claim 1 further including tensioning means between second ends of said leg members for tensioning said second ends toward each other.

3. The apparatus in claim 1 further including horizontal foot pads attached to said second ends and said tensioning means comprises cables extending between said foot pads and cable fastening means for fastening said cables to said foot pads.

4. The apparatus in claim 3 in which said cable fastening means comprise a ring fastened to each of said foot pads and a closure, said ring having opposing ends defining an opening and said closure threadably engaging one of said ring ends to selectively close said opening.

5. The apparatus in claim 1 in which said hangers are aligned along an axis and two of said sockets are oriented on a plane which intersects said platform surface generally parallel said axis.

6. The apparatus in claim 5 in which said axis is substantially centered between the third one of said sockets and the portion of said platform surface which said plane intersects.

7. The apparatus in claim 6 in which said two of said sockets are spaced apart a distance greater than the distance between said third one of said sockets and the portion of said platform which said plane intersects.

8. A portable game support apparatus comprising:
    a platform assembly including a generally planar platform defining a surface, first and second sockets attached to said surface and extending therefrom on a plane which intersects said surface at a first axis, an elongated member extending from said surface at a point spaced from said first axis, said elongated member having a first end nonrotatably attached to said platform, a third socket attached to a second end of said elongated member, a winch mounting bracket attached to said elongated member and a plurality of closely spaced hangers fixedly attached to said platform surface and oriented on a second axis, said second axis generally parallel said first axis and generally centered between said point and said first axis; and first, second and third tubular legs having first ends for telescoping engagement with said first, second and third sockets and second ends including planar feet, each of said legs comprising a plurality of interfitting elongated leg sections.

9. The apparatus in claim 8 further including tensioning means extending between said feet for tensioning said second ends of said legs toward each other.

10. The apparatus in claim 10 further including a manually operable winch attached to said winch bracket.

11. The apparatus in claim 9 further including a pulley extending from one of said hangers, a cable operatively attached to said winch at a first end and terminating in a hook at a second end, said cable extending over said pulley.

12. The apparatus in claim 11 further including tensioning means extending between said feet for tensioning said second ends of said legs toward each other.

* * * * *